(12) United States Patent
Jepsen et al.

(10) Patent No.: US 12,466,700 B2
(45) Date of Patent: Nov. 11, 2025

(54) LIFTING APPARATUS FOR A LIFTING CRANE

(71) Applicant: Siemens Gamesa Renewable Energy A/S, Brande (DK)

(72) Inventors: Andreas Winther Jepsen, Vejle (DK); Jesper Moeller, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/402,719

(22) Filed: Aug. 16, 2021

(65) Prior Publication Data

US 2022/0055867 A1 Feb. 24, 2022

(30) Foreign Application Priority Data

Aug. 19, 2020 (EP) ..................................... 20191685

(51) Int. Cl.
| | | |
|---|---|---|
| B66C 13/06 | (2006.01) | |
| B66C 1/10 | (2006.01) | |
| F03D 13/10 | (2016.01) | |

(52) U.S. Cl.
CPC ............ B66C 13/063 (2013.01); B66C 1/108 (2013.01); F03D 13/10 (2016.05); *F05B 2230/61* (2013.01)

(58) Field of Classification Search
CPC ..... B66C 13/063; B66C 13/085; B66C 13/16; B66C 13/08; B66C 1/108; B66C 1/12; B66C 1/62; B66C 1/427; B66C 13/04; B66C 13/06; B66C 23/185; B66C 1/42; F03D 13/10; F03D 13/40; F03D 13/401; F05B 2230/61

USPC ......................................................... 212/273
See application file for complete search history.

(56) References Cited

U.S. PATENT DOCUMENTS

| | | | | |
|---|---|---|---|---|
| 3,606,033 | A | * | 9/1971 | Barilla ................... B23Q 1/527 414/777 |
| 9,358,996 | B2 | * | 6/2016 | Van Der Zee .......... B66C 1/108 |
| 9,945,351 | B2 | * | 4/2018 | Lulker .................... F03D 13/40 |
| 10,161,388 | B2 | * | 12/2018 | Westergaard ........... F03D 13/40 |
| 2008/0216301 | A1 | | 9/2008 | Hansen |
| 2011/0031292 | A1 | * | 2/2011 | Krogh ..................... F03D 13/40 224/570 |
| 2011/0185571 | A1 | * | 8/2011 | Maj ......................... B66C 1/427 29/889 |
| 2011/0221215 | A1 | * | 9/2011 | Botwright ............... B66C 13/08 294/81.4 |
| 2012/0032125 | A1 | | 2/2012 | Diaz De Corcuera |
| 2014/0356113 | A1 | | 12/2014 | Schmidt et al. |

(Continued)

FOREIGN PATENT DOCUMENTS

| | | |
|---|---|---|
| CN | 102951548 A | 3/2013 |
| CN | 104214053 A | 12/2014 |

(Continued)

*Primary Examiner* — Anna M Momper
*Assistant Examiner* — Henrix Soto
(74) *Attorney, Agent, or Firm* — Schmeiser, Olsen & Watts LLP (57) ABSTRACT

Provided is a lifting apparatus for a lifting crane, adapted to carry an elongated component having a non-circular cross section extending over the major part of its length, especially a rotor blade of a wind turbine, including a frame with at least one holder for holding the component with a horizontal orientation, wherein a pitching system for pitching the component around its longitudinal axis is provided.

15 Claims, 4 Drawing Sheets

(56) References Cited

U.S. PATENT DOCUMENTS

| | | | |
|---|---|---|---|
| 2015/0028608 A1* | 1/2015 | Wubbelmann | B66C 1/108 |
| | | | 294/81.61 |
| 2015/0028610 A1 | 1/2015 | Hansen et al. | |
| 2017/0233228 A1* | 8/2017 | Coners | B66C 13/46 |
| | | | 29/889.21 |
| 2017/0267499 A1* | 9/2017 | Frank | B66C 13/08 |
| 2019/0292020 A1 | 9/2019 | Moeller | |
| 2019/0301430 A1* | 10/2019 | Üyünük | B60P 3/40 |

FOREIGN PATENT DOCUMENTS

| | | | | |
|---|---|---|---|---|
| CN | 104340861 A | | 2/2015 | |
| CN | 105270986 A | | 1/2016 | |
| CN | 207699037 U | * | 8/2018 | ............ B66C 1/108 |
| CN | 109996750 A | | 7/2019 | |
| CN | 110407086 A | * | 11/2019 | |
| EP | 2738133 A1 | * | 6/2014 | ............ B66C 1/108 |
| EP | 2808540 A1 | | 12/2014 | |
| EP | 2832988 A1 | | 2/2015 | |
| EP | 2873641 A1 | * | 5/2015 | ............ B66C 1/108 |
| JP | 2010216317 A | * | 9/2010 | ............ F03D 13/40 |
| KR | 20150102518 A | * | 9/2015 | |

\* cited by examiner

LIFTING APPARATUS FOR A LIFTING CRANE

CROSS-REFERENCE TO RELATED APPLICATIONS

This application claims priority to European Application No. 20191685.5, having a filing date of Aug. 19, 2020, the entire contents of which are hereby incorporated by reference.

FIELD OF TECHNOLOGY

The following refers to a lifting apparatus for a lifting crane, adapted to carry an elongated component having a non-circular cross-section extending over the major part of its length, especially a rotor blade of a wind turbine, comprising a frame with at least one holding means or holder for holding the component with an essentially horizontal orientation.

BACKGROUND

Large and elongated components are usually moved by a lifting crane, which is adapted to lift and position the respective component for attaching it for example to a construction. An example for such a component is a rotor blade of a wind turbine, which, when the wind turbine is installed, needs to be positioned and fixed to the hub of the wind turbine, to which usually three rotor blades are attached. For lifting such a component respectively a rotor blade, a specific lifting apparatus is used, which is connected to the lifting crane, and which is adapted to safely carry the component. The lifting apparatus comprises a frame with at least two support arms for carrying the component, which support arms have for example an L- or C-shape. Unlike other lifting apparatus, which lift the component hanging vertically at the component, this lifting apparatus is adapted to carry the component respectively the rotor blade with an essentially horizontal orientation, which is advantageous for lowering the loads applied to the crane boom, which became higher due to the increasing size of the blades. The lifting apparatus fixes the component at a position somewhere between its ends, so that the component extends weight balanced to both sides of the apparatus and is, when lifted, essentially horizontal, which means that the longitudinal axis of the apparatus is horizontal and also the longitudinal axis of the component is at least essentially horizontal. For controlling the horizontal movement in the horizontal plane of the component respectively the blade a tagline system is usually used, which comprises several cables attached to the lifting apparatus. This allows for a certain control of the horizontal movement. Nevertheless, especially when the component respectively the blade is lifted at higher wind speeds, a certain vertical movement occurs, which is especially problematic in view of a vertical movement of the blade root, which blade root needs to be precisely positioned relative to the attachment interface of the hub. This vertical movement respectively vertical tilt moment results from the airfoil cross-section of the rotor blade. When the wind blows with higher speed around the rotor blade, different wind speeds are given at the upper and the lower side of the blade, resulting in a pressure difference between the upper and the lower side. These pressure difference leads to a certain suction or drag effect moving the blade to the lower pressure side. This effect in turn results in the tilting movement, as the blade as a whole follows this effect. This effect is commonly known from airplane wings, but has a negative influence on the installation process of for example a turbine blade.

The vertical movement may negatively influence the positioning and fixing process. As it is caused by the wind interacting with the component, especially the airfoil shaped blade, it restricts the installation to times where the wind speed is quite low and therefor narrows the weather window, in which the installation can be done. This is especially a problem at off-shore installations of wind turbines, as the wind over the sea is often strong. Further the unwanted vertical movement causes long installation times due to the problems in positioning the root.

SUMMARY

An aspect relates to an improved lifting apparatus.

Embodiments of the invention propose a lifting apparatus for a lifting crane, adapted to carry an elongated component having a non-circular cross-section extending over the major part of its length, especially a rotor blade of a wind turbine, comprising a frame with at least one holding means or holder for holding the component with a horizontal orientation, which lifting apparatus is characterized in that a pitching system for pitching the component around its longitudinal axis is provided.

The inventive lifting apparatus, usually also called a yoke, is equipped with a pitching system, which is adapted to pitch or rotate the component around its longitudinal axis. As the component has a non-circular cross-section, especially in case of a rotor blade an airfoil cross-section, the pitching or rotation of the component by the pitching system changes the spatial orientation of the non-cylindric surface respectively the upper and lower surface e.g. of the airfoil rotor blade. As mentioned, when the wind flows around the rotor blade with a higher wind speed, different wind speeds or different wind flows are given at the upper and the lower side of the blade, resulting in a pressure difference between the upper and the lower side of the blade respectively the component. Resulting from this pressure difference, a certain suction or drag effect occurs, which makes the blade move in a vertical direction creating the previously mentioned problems. This negative effect depends on the orientation of the component respectively its non-circular cross-section part respectively its positioning relative to the wind direction. In this context, the term "rotation around the longitudinal axis of the component" does not necessarily mean that the horizontal component axis is the axis of rotation. In an embodiment, the axis of rotation of the pitching system is falls together with the components own longitudinal axis. But for the inventive change of the spatial surface orientation it is sufficient when the component orientation is changed by pivoting it around its longitudinal axis, which is also realized when the axis of rotation, i.e. the rotation axis of the pitching system, does not fall together with the longitudinal axis of the component. Inventively the essentially horizontally orientated component is pitched by the pitching means or pitch device having a rotation axis, so that the component rotates in response to the rotational movement of the pitching means or pitch device. The rotation and therefore the change of the orientation of the component relative to the direction of the blowing wind realizes an effect on the vertical movement of the component and therefore for example of the blade root for counteracting an unwanted vertical movement.

The inventive pitching system integrated in the inventive lifting apparatus now allows for changing this spatial orientation, i.e. the orientation of the non-circular surface relative to the wind direction and therefore allows for a change of the wind flow over the upper and the lower side or surface of the component. The length of the respective flow paths can be changed by the rotation around the longitudinal axis respectively the change of the spatial orientation, resulting in a change of the respective pressure generated at the upper and the lower side and therefore the pressure difference, which is causal for the vertical root end movement. By rotating the component and therefore changing its spatial surface orientation a counteracting tilt moment or tilt movement can therefore be generated. This counteracting tilt moment or tilt movement can at least in part, or totally, balance the tilt moment or tilt movement caused by the wind acting on the component before the rotation was initiated. Therefore, by changing the aerodynamic arrangement of the component respectively the rotor blade fixed to the lifting apparatus, an unwanted tilt moment or tilt movement induced by higher wind speeds can be at least in part, or totally, compensated. This allows for an improved and especially faster installation process, e.g. of a wind turbine blade, which may now also be performed at higher wind speeds for example up to 16 m/s or higher, whereby a rotor blade installation at these high wind speeds is either not possible with known lifting apparatus or takes a lot more time due to the uncontrollable vertical tilting or vertical movement.

For pivoting the component around its longitudinal axis, the pitching system may comprise at least one holding means or holder, which is pivotable around a rotation axis, e.g. the longitudinal axis of the frame for pitching the component. The rotation axis of the pitching system respectively of the holding means or holder and the longitudinal axis of the frame respectively of the lifting apparatus and the general longitudinal axis of the component are parallel. Therefore, by rotating the at least one holding means or holder around the rotation axis, which may be the longitudinal horizontal frame axis also the component rotates. As mentioned, the term "rotation around the longitudinal axis of the component" does not necessarily mean that the horizontal component axis is the axis of rotation. This is the case when the axis of rotation does not fall together with the horizontal axis of the component, as is maybe the case when the holding means or holder rotates. Nevertheless, also in this case the spatial orientation is changed creating the inventive counter tilt moment due to the changed aerodynamic properties respectively interaction of the blade with the blowing wind.

The lifting apparatus may comprise at least two support arms, whereby separate holding means or holder adapted for a synchronized rotation are arranged at each support arm, or whereby the holding means extends from one support arm to the other. Usually, such a lifting apparatus respectively its frame has two C-shaped support arms for carrying the component. At these support arms or in the arm region the at least one holding means or holder is arranged. In a first embodiment it is possible to have a respective holding means or holder arranged at each support arm, whereby the component respectively the blade extends through both holding means or holder, where it is firmly fixed. Both holding means or holder rotate in a synchronized manner around the common rotation axis, thereby pitching the component. In another alternative, only one common holding means or holder, which extends from one support arm to the other is provided, which firmly fixes the component. Also, by rotating this single holding means or holder, the inventive pitching may be performed.

In an embodiment, the at least one or each holding means or holder or the two holding means or holder are adapted to hold the component in a region with a non-circular cross-section. As already mentioned, the non-circular cross-section extends over at least half of the length of the component. In case of a turbine blade this non-circular or airfoil cross-section extends over nearly the whole length of the blade except for a very short root section, which has a circular cross-section and by which the blade is attached to the hub. For a weight balance fixation, in order to hold the blade with a horizontal orientation, the one or both holding means or holder need to fix or be attached to the component in the airfoil area. The or each holding means or holder may comprise specially designed holding pads or the like, which are adapted to be coupled to the component surface in a form-fit or form-corresponding manner.

In a further embodiment of the invention, the or each holding means or holder may comprise a C-shaped holding part with holding elements, e.g. the above-mentioned holding pads or the like, for engaging the component, which holding part is movable along an arched guide means or guide. As mentioned, the inventive pitching system respectively the holding means or holder, which is part of which the pitching system, rotates around a rotation axis, which is a horizontal axis. For attaching the holding means or holder to the blade, the holding part or the holding parts are C-shaped, so that the blade can be inserted in the C-shaped holding part and be firmly fixed by the holding elements like the pads or the like. For the rotation the or each holding part is movable along an arched guide means or guide, which defines the circular movement path for performing the pitching respectively rotation action. This guide means or guide may for example be an arched guide rail or the like, along which the respective C-shaped holding part moves.

For a smooth movement it is desirable that the holding part respectively each holding part is guided on rollers or slide elements arranged in or along the guide means or guide. According to this embodiment several rollers are arranged at the guide means or guide, for example the arched guide rail, on which rollers the respective holding part rests respectively moves during the rotational displacement. This embodiment therefore proposes a kind of roller bearing system for allowing a smooth and precise movement of the holding part relative to the frame respectively the support arms. In an alternative also a sliding bearing may be used comprising slide elements for slidingly guiding the holding part. The sliding elements may be arranged both on the holding means or holder and the guide means or guide.

For moving the holding means or holder respectively the holding part in order to rotate it and pitch the component, the or each holding means or holder may be movable by at least one controllable actuator. This actuator is adapted to move the holding means or holder respectively the holding part for rotating it. If only one holding means or holder respectively holding part is provided, one actuator may be sufficient. If two holding means or holder respectively holding parts are provided, each holding means or holder is provided with a separate actuator, while both actuators are synchronized for a synchronous movement of both holding means or holder respectively holding parts.

The actuator may be any kind of actuator which is adapted to cause or perform the rotational movement. An actuator may be or may comprise a hydraulic or pneumatic or electric cylinder, which may be lengthened or shortened, and which is coupled to the moving part of the holding means or holder respectively the holding part. It may also be an electric motor as a drive means, which is coupled for example by a mechanical toothed connection to the moving part of the holding means or holder respectively the holding part. Also, a spindle drive may be used as a mechanical connection between an electric motor and the moving part. The mentioned actuator types are not limited, as also other types may be used if appropriate.

In an embodiment, at least one control device is provided for controlling the movement of the at least one holding means or holder, especially by controlling the or each actuator. This control device, which comprises a respective programmable control, allows for very precisely controlling the movement of the holding means or holder and therefore the spatial rotation of the component in order to generate the necessary counter tilt effect.

For a very exact control at least one or sensor for sensing a given or upcoming vertical tilting of the lifting apparatus or of the frame or of at least one support arm is provided, whereby the control device is adapted to control the pitching system, especially the movement of the at least one holding means or holder depending on the sensor means or sensor information. The sensor means or sensor is, in general, adapted to sense the vertical tilt movement of the lifting apparatus. It is arranged at the frame or a support arm, while certainly several various sensors may be arranged at different positions. The or each sensor means or sensor communicates with the at least one control device. The lifting apparatus may comprise only one control device, which controls the one holding means or holder or which controls both holding means or holder respectively the respective actuators. In case of two holding means or holder certainly separate control devices may be provided, which communicate with each other for a synchronized movement. The control device is adapted to process the respective sensor means sensor information and to recognize any upcoming or given inadmissible vertical tilt movement of the component respectively the blade or the blade root. Based on the measured vertical tilt movement, which is either already given, or which may be expected due to the sensor information, the control device may activate and control the pitching system respectively the movement of the holding means or holder respectively the actuator for effecting the change of the spatial orientation of the component respectively the blade for generating the counter tilt moment respectively the counter tilt movement. The sensor means or sensor may measure the orientation or movement directly or, maybe with one or more separate sensors, for example the wind speed or the wind direction as indirect parameters for determining a given or upcoming tilting movement.

The sensor means or sensor or the sensor may be any kind or sensor, which is adapted for directly or indirectly evaluating pieces of information, which are direct or indirect pieces of information regarding the spatial orientation and therefore the tilting movement or tilting position. An example may be a position sensor or acceleration sensor.

The pitching system is adapted to rotate the component over an angle of at least 20°, of at least 40° and over a maximum angle of 90°. Even a small adjustment of the angled orientation over a maximum angle of 20°, resulting in a pitch of +−10°, seen from basic orientation of the component respectively the blade when it is first fixed in the lifting apparatus, may be sufficient to change the aerodynamic situation and to counter an unwanted tilt movement. A larger rotational compensation angle of for example 40° allows for a pitch of +−20°, while a maximum angle of 90° resulting in a pitch of +−45° should be the maximum angle of displacement. The pitching is always performed starting from a basic position of the component respectively the blade. This basic position is defined by the position, in which the holding means or holder is arranged, when the blade is fixed for the first time on the ground at the beginning of the lifting process. From this basic orientation a rotation in both directions, i.e. a +-pitch is possible, whereby the respective pitching direction certainly depends on the direction of the vertical movement which shall be compensated. When for example the blade root moves vertically upwards, the pitching direction for countering this movement by inducing a compensation moment in the opposite direction is certainly different to the pitching direction, which is necessary, when the blade root moves vertically downwards. In this case, the compensation moment and therefore the pitching direction is opposite. Certainly, the respective necessary pitching direction is determined by the respective control device. The control device also determines the necessary pitching angle, which needs to be controlled in order to compensate the unwanted tilting movement and to avoid an overcompensation, which means that the component is rotated only over a necessary angle, which is calculated to be sufficient to compensate the expected or given vertical movement. Certainly, the spatial orientation of the root respectively its movement is constantly sensed by the sensor means or sensor, so that the control device may constantly monitor the effect the pitching has in order to compensate the vertical movement.

Embodiments of the invention further refer to a crane comprising a lifting means or lifter with a lifting apparatus as described above. The crane may comprise a lifting means or lifter comprising one or more lifting cables, to which the connection device is attached, at which connection device the lifting apparatus is attached. The lifting apparatus may tilt relative to this connection device in a vertical direction, respectively may tilt around the horizontal axis. The counter tilt moment or the counter tilt movement counters or compensates such an unwanted vertical tilt moment or unwanted vertical tilt movement and stabilizes the component respectively the rotor blade in its horizontal position.

Furthermore, for also countering any horizontal movement of the component respectively the blade, i.e. any tilting or rotation around the vertical axis, one or more taglines may be attached to the lifting apparatus.

Finally, embodiments of the invention refer to a method for lifting a component having a noncircular cross-section extending over the major part of its length, especially a rotor blade of a wind turbine, using a crane as described above. This method is characterized in that during the lifting process, when a vertical tilting movement of the lifting apparatus or at least the possibility of such a vertical tilting movement is detected, the pitching system is controlled for pitching the component around its longitudinal axis for counteracting the tilting moment or movement. Even when the possibility of such an unwanted vertical tilting movement is sensed by one or various sensors, this sensor information may be processed and used as a hint that an unwanted vertical movement may happen, allowing for the control device to immediately react beforehand.

During the lifting process, the orientation of the lifting apparatus may constantly be sensed by at least one sensor means or sensor the lifting apparatus, whereby the pitching system is controlled by a control device based on the provided sensor means or sensor information. The one or the several sensor means or sensor allow for constantly monitoring the position respectively the movement or any other relevant information like wind speed or wind direction, while the control device constantly processes any sensor means or sensor information to immediately control the pitching system respectively the holding means or holder for rotating it and the component.

BRIEF DESCRIPTION

Some of the embodiments will be described in detail, with references to the following Figures, wherein like designations denote like members, wherein.

DETAILED DESCRIPTION

Figure 1:
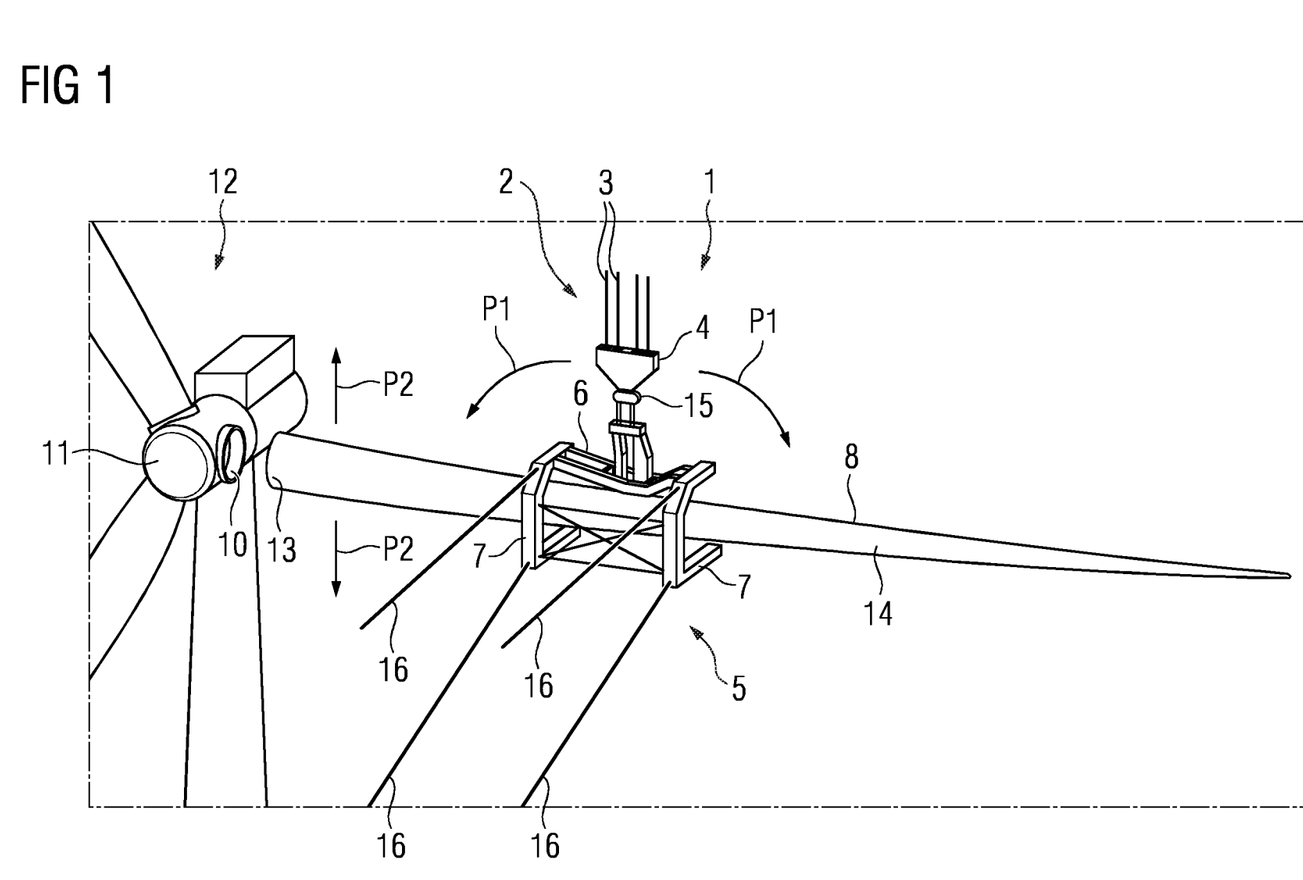
FIG. 1 shows a principle sketch of a part of an inventive crane comprising an inventive lifting apparatus holding a rotor blade to be attached to a wind turbine.

FIG. 1 shows a part of an inventive lifting crane 1 comprising a lifting device 2 with several cables 3, to which a connection device 4 is attached, as commonly known.

To the connection device 4 an inventive lifting apparatus 5, often also called yoke, is attached. The lifting apparatus 5 comprises, see also FIGS. 2 and 3, a frame 6 with two end-standing support arms 7, which here have a C-form.

Figure 2:
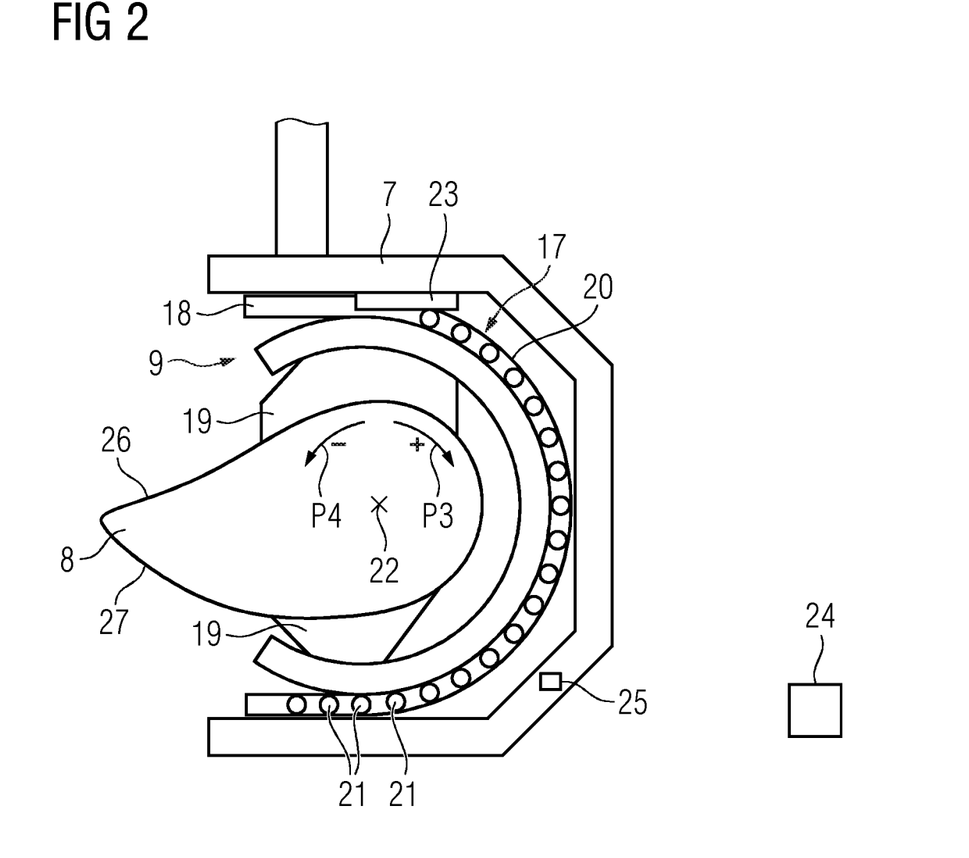
FIG. 2 shows a side view of the lifting apparatus of FIG. 1 with a cut through the blade seen from the tip of the blade, with the blade being in a basic position.
Figure 3:
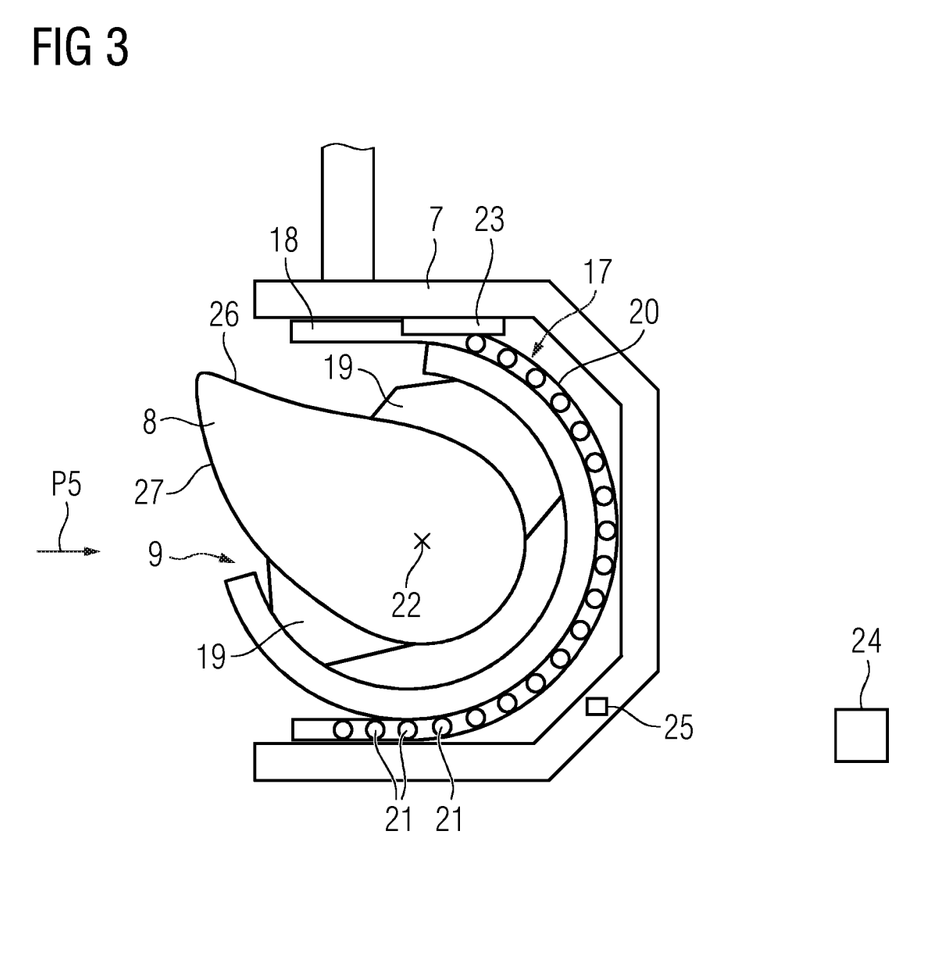
FIG. 3 shows the arrangement of FIG. 2 with the blade being rotated in a clockwise direction by the pitching system.

A component, here a rotor blade 8, is carried by the lifting apparatus 5. The C-shaped support arms 7 are equipped with respective holding means or holder 9 for holding or gripping the rotor blade 8.

The rotor blade 8 is arranged in a horizontal direction and is lifted to be attached to a mounting interface 10 of a hub 11 of a wind turbine 12 shown in FIG. 1. It is therefore necessary to precisely position the blade root 13, which connects to the airfoil-shaped blade body 14, exactly relative to the mounting interface 10. This lifting and positioning is sometimes performed while wind blows and therefore interacts with the rotor blade 8 making the rotor blade 8 move.

The connection of the lifting apparatus 5 to the connection device 4 is not stiff. It is realized for example by a cable connection 15, which allows for the lifting apparatus 5 and therefore for the rotor blade 8 to rotate around a vertical axis. For stabilizing the lifting apparatus 5 respectively the rotor blade 8 taglines 16 are attached to the lifting apparatus 5, by which a horizontal movement may be avoided or at least widely compensated.

The cable connection 15 does not only allow for a rotation around a vertical axis, but also for a tilting movement around a horizontal axis, which tilting movement is shown by the arrows P1. This tilting movement makes the lifting apparatus 5 tilt to the left or right side shown in FIG. 1, which tilting movement results in a respective movement of the rotor blade 8. Therefore, depending on the tilting to the left or to the right, the blade root 13 either performs a vertical movement upwards or downwards, as shown by the arrows P2 in FIG. 1. Therefore, its relative position to the mounting interface 10 may change due to such a vertical movement, which therefore needs to be counteracted.

Figure 4:
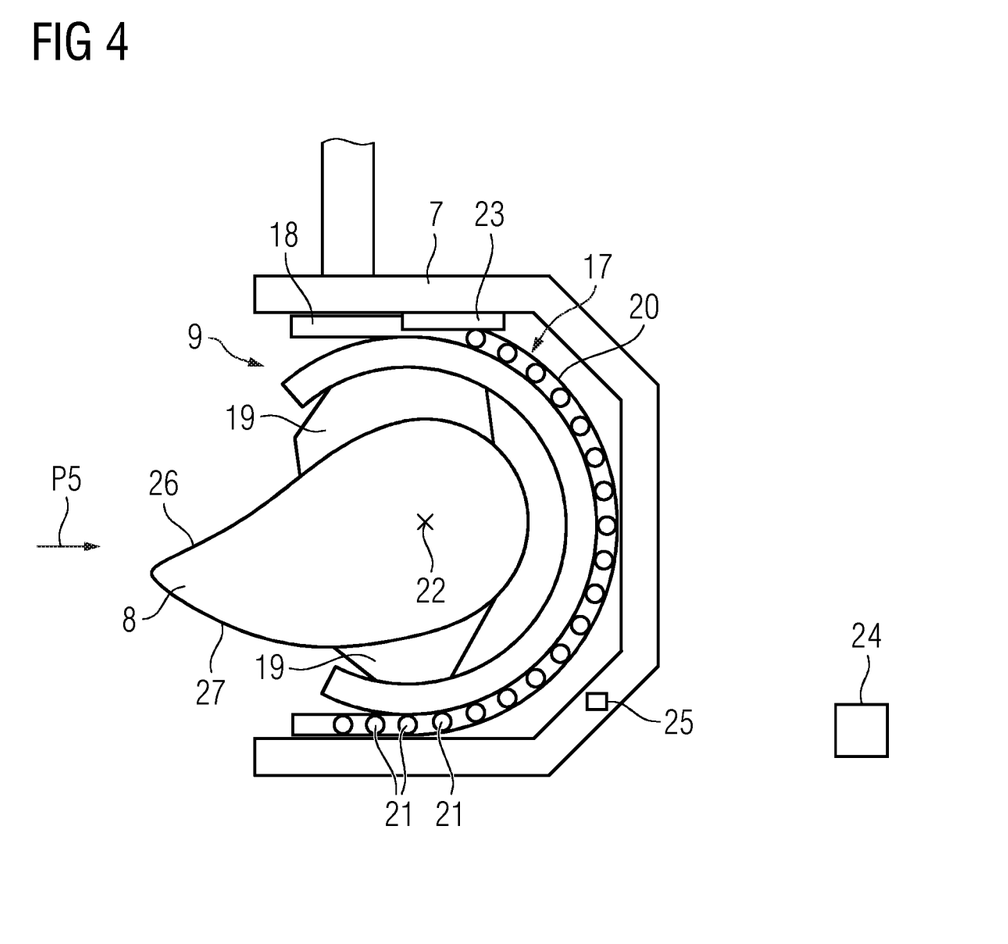
FIG. 4 shows the arrangement of FIG. 2 with the blade being rotated counterclockwise by the pitching system.

For counteracting such a vertical movement, the lifting apparatus 5 comprises a pitching system 17, which is adapted to rotate the rotor blade 8 around its longitudinal axis respectively to change its spatial orientation, as shown in FIGS. 2-4.

As FIG. 2 shows in more detail, the rotor blade 8 is fixed in the holding means or holder 9. Each C-shaped arm 7 for example is equipped with a separate holding means or holder 9, which holding means or holder are part of the pitching system 17. The holding means or holder 9 comprises a holding part 18, which here has for example a C-shaped form, to which holding part 18 respective holding elements 19 like holding or clamping pads or the like are attached, which, as FIGS. 2-4 show, firmly fix the rotor blade 8. They are adapted to hold the rotor blade 8 in a region with a non-circular cross-section, as clearly shown in the figures. The clamping mechanism of the holding means or holder shown in the figure is just an example. It may be realized in various ways, e.g. with clamping claws with at least one of the claws being movable from an open to a clamping position, or with a scissor-like moving means or mover for at least one of the clamps.

The holding means or holder 9 is rotatable around a rotation axis, which in general is a horizontal axis, which is parallel to a central axis of the frame respectively the lifting apparatus in general. For rotating the holding means or holder 9 it comprises respectively is arranged on an arched guide means or arched guide 20, here in form of a C-shaped guiderail or the like, along which it is movable respectively rotatable. The arched guide means or arched guide 20 is equipped with a number of rollers 21, on which the holding part 18 rolls and is guided, when it rotates around the rotation axis 22 of the holding means or holder 9 respectively the pitching system 17. The rollers 21 may be arranged along the whole path along which the holding part 18 moves, or only at some separate points along the path. Instead of rollers 21 also sliding elements building a slide bearing may be used.

For effecting this rotational movement, at least one actuator 23 is provided, whereby, as in this embodiment, two separate holding means or holder 9 are provided at each support arm 7, two respective actuators 23, one for each holding means or holder 9, are provided, which are synchronized, in order to realize a synchronized movement of the holding part 18. An actuator 23 may for example be a hydraulic or pneumatic or electric cylinder, which can be changed in its length and which is with one end coupled to, for example, the support arm 7, while the other end is coupled to the holding part 18 or the like. Certainly, the actuator 23 may also be an electric motor which is mechanically coupled for example by a spindle drive or a toothed connection to the holding part 18 etc. Any actuator is suitable, as long as it is able to initiate a circular or rotating movement of the holding part 18 and with it of the blade 8 along the arched guide means or arched guide 20.

For controlling the actuator 23 a control device 24 is provided, which controls the one or both actuators 23 in order to adjust the spatial orientation of the blade 8 by pitching it. The control device 24 communicates with the respective actuator 23, and also with at least one or more, sensor means or sensor 25, which is adapted to sense the spatial orientation of the lifting apparatus 5 respectively the frame 6 especially in regard of the vertical orientation respectively a vertical movement, which orientation or movement is an indicator of the vertical position or movement of the blade root 13 which needs to be aligned with the mounting interface 10. This sensor means or sensor 25 may for example be a position sensor or an acceleration sensor or the like. Besides the fully automatic control also a partly automatic control is possible, e.g. with a sensor means or sensor sensing a movement of the lifting apparatus and a manual control of the actuators based on the sensor information or the like.

The control device 24 is adapted to analyze the sensor means or sensor information in order to determine whether an unwanted vertical movement of the lifting apparatus 5 and therefore of the blade root 13 is likely to happen or is already given, and which measures need to be taken in order to counter this unwanted movement. So, the control device 24 may, due to the constant monitoring of the spatial situation by the one or the several sensor means or sensor 25, immediately respond to any relevant information from the constantly monitoring sensor means or sensor 25 in order to immediately control or provide a respective counteraction by controlling the actuators 23 and therefore by controlling the pitching system 17 in order to rotate the rotor blade 8 in a clockwise direction (see arrow P3) or in a counterclockwise direction (see arrow P4). The control device 24 is adapted to determine the direction of rotation based on the information regarding the direction of the possible or given movement and the known orientation of the rotor blade 8 fixed in the holding means or holder 9, respectively its airfoiled surfaces.

FIG. 2 shows the arrangement of the rotor blade 8 in the position, in which it is fixed or gripped by the holding means or holder 9 for the first time on the ground in order to be lifted to the hub. In this position, the holding parts 18 of both holding means or holder 9 are arranged in a basic position or an intermediate position, from which in both clockwise and counterclockwise directions for example the same angle of rotation may be run. If now the rotor blade 8 is lifted, it is in the basic horizontal position.

When now wind blows, the wind may interact with the rotor blade 8 and flow around the upper surface 26 and the lower surface 27 of the rotor blade 8, which surfaces 26, 27 have different shapes due to the non-circular cross-section of the rotor blade 8, as clearly shown in FIGS. 2-4. This leads to different wind speeds on the upper and lower surface side, as the upper surface 26 and the lower surface 27 have different lengths, along which the wind flows. As commonly known, a pressure difference results, which may generate a certain suction or drag in the vertical direction, making the blade move downwards or upwards, and therefore also making the blade root 13 move downwards or upwards, as the rotor blade 8 and therefore the lifting apparatus 5 are movable around the horizontal axis of the cable connection 15, as already mentioned.

In order to counteract or compensate this unwanted vertical movement, it is possible by controlling the pitching system 17 to rotate the rotor blade 8 around the longitudinal axis 22 either in a clockwise direction (arrow P3) or in a counterclockwise direction (arrow P4), with the basic position of FIG. 2 as a starting point. This rotational movement is controlled by the control device 24, which is adapted to calculate the necessary angle of rotation in order to change the spatial orientation of the rotor blade 8 respectively its upper and lower surface 26, 27 in a way sufficient to compensate or counteract the vertical tilt respectively the pressure difference which is the cause for the unwanted vertical tilt.

FIG. 3 shows an example, where the control device 24 controls the pitching system 17 to rotate in the clockwise direction according to arrow P3. It controls the actuators 23 to move the holding part 18 along the arched guide means or arched guide 20, which movement is guided by the rollers 21 allowing for a very soft but stable movement. This rotates the holding means or holder 9 around the horizontal rotation axis 22, and with it also the rotor blade 8 is rotated around its longitudinal axis changing its spatial position as clearly shown in FIG. 3. Again, the axis of rotation 22 must not be the longitudinal axis of the blade 8, but the blade 8 is pivoted around its longitudinal axis by rotating the holding means or holder 9 around its rotation axis 22. FIG. 3 shows that the upper surface 26 has another orientation relative to the blowing wind, which blows in this example from the left side as shown by arrow P5, as in the basic position according to FIG. 2. The same is true for the lower surface 27. By changing this spatial orientation, the aerodynamic situation is severely changed, as the surface lengths, along which the wind flows along the upper and lower surfaces 26, 27, changes. Resulting from this, also the pressure difference between the upper and the lower side changes, and with it the given suction or drag, which is the reason for the unwanted vertical movement. This movement therefore is counteracted and compensated.

As the control device 24 is adapted to calculate the necessary pitching angle, a very precise counteraction or compensation is possible. It is to be noted, that any rotational position between the basic starting position and the maximum rotational position in the clockwise or counterclockwise direction may be controlled in order to mostly or completely compensate the unwanted vertical movement, and in order to avoid any overcompensation. It is possible that a calculation means respectively the control device itself calculates or simulates the effect of various pitching movements or angles at the given wind direction and wind speed on the component respectively the blade to model how it reacts. The control device 24 can then choose the most promising pitching angle and pitching direction based on this input.

FIG. 4 shows an example, in which the pitching system 17 is controlled by the control device 24 for a movement of the holding part 18 in the counterclockwise direction according to arrow P4. As shown, the position of the holding part 18 relative to the arched guide means or arched guide 20 has again changed compared to the basic situation, as the holding part 18 is moved along the arched guide means or guide 20 by controlling the actuators 23. As shown in FIG. 4, the upper surface 26 and the lower surface 27 again have a very different spatial orientation relative to the blowing wind respectively the wind direction (arrow P5), compared to the basic situation of FIG. 2 or to the situation of FIG. 3. Again, the aerodynamic situation changes severely resulting in a remarkable change of the pressure difference between the upper and the lower blade side and therefore the suction or drag resting on the blade 8. Again, this allows for a compensation of the unwanted tilt movement in this specific situation.

It is to be noted, that FIGS. 2-4 are only principle sketches especially with regard to the shown wind direction according to arrow P5. This arrow is only shown in order to demonstrate the change of the spatial orientation of the upper and the lower surface 26, 27, relative to a wind direction. It is no indication that the blade 8 needs to be rotated or positioned according to FIG. 3, when the wind blows from this direction, or needs to be positioned according to FIG. 4 in this wind direction situation. The direction and the angle of rotation is solely determined by the control device 24 based on the sensor means or sensor information.

The pitch or rotation angle may in total be for example 20°, with an angle of +−10° starting from the basic position according to FIG. 2. It may certainly also be a larger angle, for example a total angle of 40° with a respective pitching angle of +−20° starting from the basic position of FIG. 2. A maximum angle may for example be 90°, with a pitch angle of +−45° starting from the basic position of FIG. 2. As mentioned, any intermediate position may be controlled and fixed in order to compensate vertical tilt.

The inventive pitching system allows for a very variable change of the aerodynamic properties of the whole lifting arrangement respectively of the rotor blade and therefore of the forces acting on the lifting apparatus 5 and therefore for a very variable, changeable interaction of the blade 8 with the wind in order to produce a defined counteracting tilt moment or tilt movement, which counteracts or compensates an unwanted tilt moment or tilt movement resulting from the interaction of the fast blowing wind with the airfoil-shaped rotor blade 8. The compensation or counteracting system, the pitching system 17, allows for the installation of such a rotor blade 8 also at weather conditions in which up to now such an installation was not possible due to the strongly blowing wind. Now, the installation may also be done at wind speeds of 16 m/s and higher, as the system allows for an excellent compensation of any unwanted vertical movement. Therefore, the weather window, in which the installation may be done is significantly widened. Furthermore, the inventive stabilization or compensation allows for a faster installation, as no time is needed for a cumbersome positioning or orientation of the rotor blade root 13 relative to the mounting interface 10, as no unwanted vertical movement occurs and as the horizontal movement can be countered by the taglines 16.

Finally, the inventive lifting apparatus respectively the crane with the inventive compensation or counteracting pitching system allows for installing even larger blades, which interact even more with the wind causing the previously mentioned problems with an unwanted vertical movement, as this movement can be compensated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A lifting yoke for a lifting crane, adapted to carry an elongated rotor blade comprising a non-circular cross section extending over a major part of its length, comprising:
    a frame with at least one holder for holding the elongated rotor blade with an essentially horizontal orientation and a pitching system for pitching the elongated rotor blade around its longitudinal axis, wherein the at least one holder comprises a C-shaped holding part with holding elements for engaging the elongated rotor blade, and wherein the C-shaped holding part is movable along an arched guide of the pitching system, the arched guide equipped with a plurality of rollers or slide elements arranged along a whole path of the arched guide or at separate points along a path of the arched guide that are both above and below the longitudinal axis of the elongate rotor blade, wherein the frame is configured to be lifted by the lifting crane, wherein the frame is suspended by a cable while lifted by the lifting crane,
    at least one sensor for sensing a vertical movement of the lifting yoke or of the frame or of at least one support arm caused by a pressure difference resulting from wind acting on the elongated rotor blade while the frame is suspended by the cable, and
    at least one control device for controlling the movement of the at least one holder, wherein the at least one control device is adapted to control the movement of the C-shaped holding part along the arched guide of the pitching system to change an aerodynamic arrangement of the elongated rotor blade depending on the vertical movement caused by the pressure difference resulting from wind acting on the elongated rotor blade sensed by the at least one sensor while the frame is suspended by the cable.

2. The lifting yoke according to claim 1, wherein the at least one holder is pivotable around a rotation axis.

3. The lifting yoke according to claim 2, further comprising at least two support arms, wherein each support arm has a respective at least one holder adapted for a synchronized rotation, or wherein the at least one holder extends from one support arm to the other support arm.

4. The lifting yoke according to claim 2, wherein the at least one holder is movable by at least one controllable actuator.

5. The lifting yoke according to claim 4, wherein the at least one controllable actuator is or comprises a hydraulic or pneumatic or electric cylinder, an electric motor or a spindle drive.

6. The lifting yoke according to claim 1, wherein the at least one holder is adapted to hold the elongated rotor blade in a region with the non-circular cross section.

7. The lifting yoke according to claim 1, wherein the holding part is guided on rollers or slide elements arranged in or along the arched guide.

8. The lifting yoke according to claim 1, wherein pitching system respectively the at least one holder is adapted to rotate the elongated rotor blade over an angle of at least 20°, of at least 40°, or over a maximum angle of 90°.

9. A crane comprising a lift with the lifting yoke according to claim 1.

10. The crane according to claim 9, wherein a connection device is attached to the lifting yoke and the cable.

11. The crane according to claim 9, wherein one or more taglines are attached to the lifting yoke.

12. A method for lifting a rotor blade comprising a non-circular cross section extending over the major part of its length, using the crane according to claim 9, wherein during a lifting process, when a vertical movement of the lifting yoke is detected, the pitching system is controlled for pitching the rotor blade around its longitudinal axis for counteracting the vertical movement.

13. The method according to claim 12, wherein during the lifting process the orientation of the lifting yoke is constantly sensed by at least one sensor of the lifting crane, whereby the pitching system is controlled by a control device based on provided sensor information.

14. The method according to claim 13, wherein the control device controls the movement of the at least one holder.

15. A lifting yoke for a lifting crane, the lifting crane configured to carry an elongated rotor blade comprising a non-circular cross section extending over a major part of its length, wherein the lifting crane is configured to be lifted by the lifting crane, wherein the lifting yoke is suspended by a cable when the lifting yoke is lifted by the lifting crane, the lifting crane comprising:
    a frame with a holder for holding the elongated rotor blade with a substantially horizontal orientation and a pitching system for pitching the elongated rotor blade around a longitudinal axis, wherein the holder comprises a C-shaped holding part with holding elements for engaging the elongated rotor blade, and wherein the C-shaped holding part is movable along an arched guide of the pitching system that has a plurality of rollers that are arranged in the arched guide to form a roller bearing system that is C-shaped and curves around the elongated rotor blade so that a portion of the roller bearing system is located above and below the longitudinal axis, or a plurality of slide elements to form a sliding bearing system that is C-shaped and curves around the elongated rotor blade so that a portion of the roller bearing system is located above and below the longitudinal axis, a sensor for sensing a pressure difference resulting from the wind speed while the lifting crane is suspended by the cable, and a control device for controlling the movement of holder, wherein the control device is configured to analyze information from the sensor and determine a vertical movement of lifting crane that is expected based on the information from the sensor, wherein the determined vertical movement is a result of the wind speed and/or the pressure difference acting on the elongated rotor blade, further wherein the control device is configured to control the movement of the C-shaped holding part along the arched guide of the pitching system to change an aerodynamic arrangement of the elongated rotor blade depending on the determined vertical movement.

* * * * *